Patented Oct. 4, 1927.

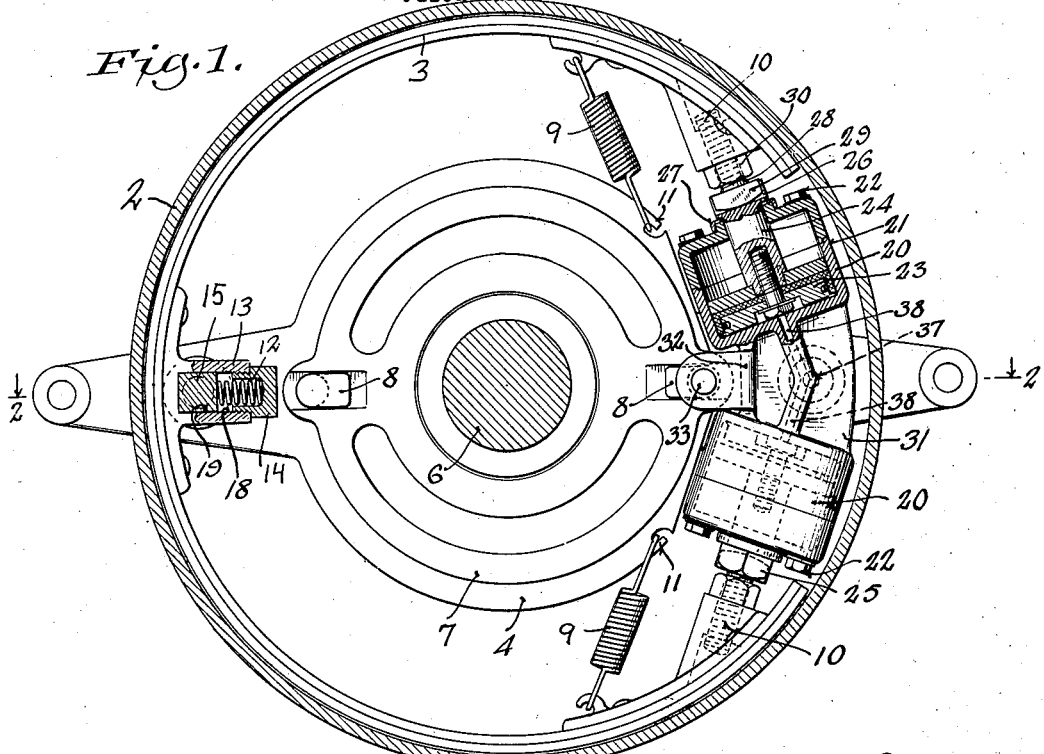

1,644,635

UNITED STATES PATENT OFFICE.

NIELS A. CHRISTENSEN, OF MILWAUKEE, WISCONSIN.

BRAKE MECHANISM FOR VEHICLES.

Application filed March 29, 1924. Serial No. 702,865.

The invention relates to brake mechanism for vehicles, and more particularly to such mechanism for use with automotive vehicles and trailers for such vehicles.

One of the objects of the invention is to provide brake mechanism operable by a pair of fluid-pressure-operated motors so arranged as to be disposed in the space available between the non-revoluble part or parts of the wheel-supporting structure and the brake-drum of the wheel.

A further object of the invention is to provide a band-brake of the internal expanding type for the rear wheel of a vehicle, which is held in a release position by springs and is applied by the operation of fluid-pressure motors.

A further object of the invention is to provide a brake mechanism in which the piston rods of the brake-cylinders have a direct thrusting, adjustable, rigid or unyielding connection with the brake-band.

The invention further consists in the several features hereinafter set forth and more particularly defined by claims at the conclusion hereof.

In the drawings: Fig. 1 is a detail sectional view taken on the line 1—1 of Fig. 2, parts being broken away and parts being shown in section;

Fig. 2 is a section taken on the line 2—2 of Fig. 1.

The invention is illustrated in connection with the rear wheel construction of a vehicle of the class described, in which 1 is the wheel whose hub has a cylindrical brake-drum 2 secured thereto, and 3 is a brake, here shown as a band, generally provided with a brake-lining 3' although not necessarily limited thereto unless specified, which is adapted to engage said drum, 4 the non-rotatable axle housing, 5 a ball-race for the wheel axle 6, 7 a ball-race retainer plate, and 8 hook-bolts on the housing securing said plate to the housing and the race 5 in place.

The brake 3 is normally held in a release position, in part by springs 9 connected at one of their ends to lugs 10 on the end portions of the band and at their other ends to hooks 11 on the housing 4, and in part by a spring 12 which is interposed between an adjustable screw-plug 14 in a yoke 13, secured to the medial portion of the band, and an anchor member 15 bolted or otherwise suitably secured to the axle housing 4, said spring 12 tending to move the band bodily away from the drum.

The band is prevented from moving laterally relative to the drum by slidably mounting the yoke 13 between guide plates 16 and 17 carried by the anchor member and engaging opposite sides of said yoke, and the yoke is confined to a straight-line movement in a radial direction by having its flat sides 18 slidably engage the flat sides 19 of the anchor member 15.

The means for applying the brake consists of fluid-pressure-operated motors 20. Each motor includes a two-part brake-cylinder 21 whose parts are secured together by bolts 22, and a suitably packed piston 23 works in each cylinder. The rod 24 for each piston has a head 25 provided with a slot 26 and is of larger diameter than the main portion of the rod so as to engage against the end of the cylinder adjacent thereto to limit the movement of the piston, and a washer 27 may be carried by said rod back of said head. The lugs 7 at the ends of the band each have threaded connection with a jackscrew 28 which has a tongue-and-groove connection with the slotted head 25 by flattening the sides of the head 29 of said screw to fit the slot, and is held in adjusted position by a locknut 30. The main body of the cylinders is cast or formed integral with a connecting web 31 which has an arm 32 apertured to receive the end 33 of one of the hook bolts, and a stud portion 34 passing through the axle housing and clamped thereto by a shoulder 35 and a nut 36, whereby the brake-cylinders are supported by the axel housing.

The stud portion 34 is provided with a bore 37 which communicates with bores 38 leading to the interior of the cylinders whereby compressed air from a pipe 39 will pass to both cylinders and act on the pistons to move them outwardly and hence move said band into braking engagement with the drum.

It will be noted that by canting the brake-cylinders relative to each other that they may be disposed in a relatively small space between the axle housing and the drum and still permit the use of a piston of relatively large diameter so as to furnish the area desired for the action of the air thereon to obtain the desired braking pressure.

No mechanism has been shown for controlling the passage of compressed air to and from the brake-cylinders as such mechanism is separate subject matter from the brake mechanism, though it will be understood that such mechanism includes a valve structure which controls the passage of compressed air through the pipe 39 and then allows the air to exhaust through pipe 39 after an application of the brake, to thereby permit the pistons to be returned to their inner position and release the band from the brake-drum.

While compressed air is the preferred pressure-transmitting medium, because of its ease of control, its adaptability for efficient service throughout all seasons of the year in different climates, and its practical efficiency even where small leakage may occur in the motor, it is to be understood that I do not wish to be limited thereto, as any other suitable gas or oil or other suitable liquid may be used to operate the motor.

I desire it to be understood that this invention is not to be limited to any specific form or arrangement of parts except in so far as such limitations are specified in the claims.

What I claim as my invention is:

1. In brake mechanism of the class described, the combination with a revoluble brake-drum, of a band brake within the drum, a wheel-support, brake-cylinders carried by said support and within the drum and inclined relative to each other, the included inner angle between the axes of the cylinders being less than 180 degrees, and a fluid-pressure-operated piston in each cylinder and having its piston rod in direct adjustable end-thrust engagement with an end portion of said band for moving the same into braking engagement with said drum, and means to release said brake.

2. In brake mechanism of the class described, the combination with a revoluble drum, of a brake within the drum, an axle housing, a ball-race mounted within said housing, a retainer plate for said ball-race, means for securing said plate to said housing, a fluid-pressure-operated motor means having a part mounted on said securing means and a part secured to said axle housing and having its piston operatively connected to said brake, and means to release said brake.

3. In brake mechanism of the class described, the combination with a revoluble brake-drum, of a band-brake within said drum, an axle housing, fluid-pressure-operated motor means including brake-cylinders inclined relative to each other and a tubular portion extending through and clamped to said housing and having a conduit in communication with said cylinders, the included inner angle between the axes of the cylinders being less than 180 degrees, and a piston working in each cylinder and operatively connected to the adjacent end portion of said brake, and means to release said brake.

4. In brake mechanism of the class described, the combination with a revoluble brake drum, of a brake within said drum, a wheel support, a pair of individual brake-cylinders within the drum and inclined relative to each other, the included inner angle between the axes of the cylinders being less than 180 degrees, a connection between the inner ends of each cylinder forming a supply conduit and also associated with said wheel support to connect said brake cylinders thereto, a fluid-pressure-operated piston in each cylinder and having its piston rod in direct thrust engagement with the brake to move it into braking engagement with said drum, and means to release said brake.

5. In brake mechanism of the class described, the combination with a revoluble brake-drum, of a brake within the drum, a support, a pair of brake cylinders mounted on said support and having their axes inclined toward each other so that the included inner angle between said axes of said cylinders is less than 180 degrees, means for introducing pressure fluid into the inner ends of said cylinders, a fluid-pressure-operated piston in each cylinder operatively connected to the brake to move it into braking engagement with said drum, and means to release said brake.

In testimony whereof I affix my signature.

NIELS A. CHRISTENSEN.